US011913227B2

(12) United States Patent
Leahy

(10) Patent No.: US 11,913,227 B2
(45) Date of Patent: Feb. 27, 2024

(54) HIGH R-VALUE INSULATED BUILDING PANEL WITH INTEGRATED WEATHER RESISTANT BARRIER

(71) Applicant: Charles H. Leahy, Asheville, NC (US)

(72) Inventor: Charles H. Leahy, Asheville, NC (US)

( * ) Notice: Subject to any disclaimer, the term of this patent is extended or adjusted under 35 U.S.C. 154(b) by 43 days.

(21) Appl. No.: 17/211,288

(22) Filed: Mar. 24, 2021

(65) Prior Publication Data
US 2021/0301526 A1    Sep. 30, 2021

Related U.S. Application Data

(60) Provisional application No. 62/994,606, filed on Mar. 25, 2020.

(51) Int. Cl.
| | |
|---|---|
| *E04B 2/00* | (2006.01) |
| *E04C 2/288* | (2006.01) |
| *E04C 2/296* | (2006.01) |
| *E04D 3/35* | (2006.01) |
| *B32B 5/18* | (2006.01) |
| *B32B 9/00* | (2006.01) |
| *B32B 9/04* | (2006.01) |
| *B32B 3/06* | (2006.01) |
| *E04C 2/00* | (2006.01) |

(52) U.S. Cl.
CPC .............. *E04C 2/288* (2013.01); *B32B 3/06* (2013.01); *B32B 5/18* (2013.01); *B32B 9/005* (2013.01); *B32B 9/042* (2013.01); *B32B 9/046* (2013.01); *E04C 2/296* (2013.01); *E04D 3/355* (2013.01); *B32B 2266/0278* (2013.01); *B32B 2307/304* (2013.01); *B32B 2419/00* (2013.01); *E04C 2002/004* (2013.01)

(58) Field of Classification Search
CPC .......... E04C 2/288; E04C 2/296; B32B 9/005
See application file for complete search history.

(56) References Cited

U.S. PATENT DOCUMENTS

| 2,307,348 | A | * | 1/1943 | Sig ........................ | F16B 15/02 |
|---|---|---|---|---|---|
| | | | | | 411/487 |
| 3,258,889 | A | * | 7/1966 | Butcher .................. | E04C 2/386 |
| | | | | | 52/407.3 |
| 3,418,776 | A | * | 12/1968 | Manderbach ......... | E04B 2/7854 |
| | | | | | 52/241 |
| 5,067,296 | A | * | 11/1991 | Brown .................... | E04C 2/386 |
| | | | | | 52/794.1 |
| 5,522,194 | A | * | 6/1996 | Graulich .................. | E04C 2/26 |
| | | | | | 52/309.4 |
| 5,765,330 | A | * | 6/1998 | Richard .................... | E04B 1/14 |
| | | | | | 52/270 |
| 6,588,172 | B2 | | 7/2003 | Porter | |
| 8,397,465 | B2 | | 3/2013 | Hansbro et al. | |
| 8,555,581 | B2 | | 10/2013 | Amend | |
| 9,382,713 | B2 | | 7/2016 | Bennett et al. | |
| 9,464,436 | B2 | * | 10/2016 | Malakauskas ............ | E04B 1/35 |
| 9,919,499 | B2 | | 3/2018 | Kreizinger | |
| 9,963,875 | B1 | | 5/2018 | Prygon | |

(Continued)

*Primary Examiner* — Basil S Katcheves
(74) *Attorney, Agent, or Firm* — NEO IP

(57) ABSTRACT

A building system including a building panel with insulation, an integrated weather resistant barrier, and sheathing. The insulated building panel increases the energy efficiency of the building system while providing protection against water, air and heat. The insulated building panel is prefabricated with the weather resistant barrier for easy installation.

15 Claims, 11 Drawing Sheets

(56) References Cited

U.S. PATENT DOCUMENTS

| | | |
|---|---|---|
| 10,167,629 B2 | 1/2019 | Ciuperca |
| 10,501,933 B2 | 12/2019 | Stroyer et al. |
| 10,570,622 B1 | 2/2020 | Lambach et al. |
| 2008/0245007 A1 | 10/2008 | McDonald |
| 2009/0223144 A1* | 9/2009 | Leahy ................. E04B 1/34321 52/745.02 |
| 2010/0088970 A1 | 4/2010 | Miller |
| 2014/0058141 A1* | 2/2014 | Nappa ................... C07C 17/278 570/172 |
| 2014/0115988 A1* | 5/2014 | Sievers ................. E04F 13/007 52/302.1 |
| 2014/0115991 A1* | 5/2014 | Sievers .................. E04C 2/386 52/309.4 |
| 2015/0121775 A1* | 5/2015 | Lippert ..................... E04B 1/26 52/79.2 |
| 2015/0140269 A1 | 5/2015 | Bahnmiller |
| 2016/0069067 A1* | 3/2016 | Ciuperca ............... E04B 1/7633 52/309.8 |
| 2016/0222656 A1* | 8/2016 | Teng .................... C04B 28/145 |
| 2016/0361894 A1* | 12/2016 | Ciuperca ................... E04B 1/80 |
| 2017/0368785 A1 | 12/2017 | Fox et al. |
| 2018/0202159 A1* | 7/2018 | Kreizinger ............ E04F 13/077 |
| 2019/0264440 A1* | 8/2019 | Grant .................... B32B 27/065 |
| 2019/0309525 A1 | 10/2019 | Santarossa et al. |
| 2019/0316352 A1 | 10/2019 | Brooks, III |

* cited by examiner

160

170

180

190

210

HIGH R-VALUE INSULATED BUILDING PANEL WITH INTEGRATED WEATHER RESISTANT BARRIER

CROSS REFERENCES TO RELATED APPLICATIONS

This applications claims priority to and the benefit of U.S. Provisional Application No. 62/994,606 filed Mar. 25, 2020, which is incorporated by reference in its entirety.

BACKGROUND OF THE INVENTION

1. Field of the Invention

The present invention relates to insulated building panels and more specifically to insulated building panels with integrated weather resistant barriers.

2. Description of the Prior Art

It is generally known in the prior art to provide an insulated building panel.

Prior Art documents include the following:

U.S. Pat. No. 9,382,713 for panel for sheathing system and method by inventor Bennett et al., filed Mar. 13, 2015 and issued Jul. 5, 2016, is directed to a panel including a water resistant barrier layer secured atop its outward facing surface. The water resistant barrier layer includes a skid resistant surface. The panels are made of lignocellulosic material. The water resistant and skid resistant surface may include indicia for aligning strips of tape or for aligning fasteners. A method for manufacturing the water resistant building panels is also disclosed and includes the steps of feeding paper onto a forming belt, depositing lignocellulosic material and the binding agent onto the forming belt so as to form a lignocellulosic mat, applying heat and pressure so as to impart the skid resistant surface on the paper, and cutting panels to predetermined sizes.

U.S. Pat. No. 10,501,933 for weather resistant temporary wall system and method by inventor Stroyer et al., filed May 29, 2018 and issued Dec. 10, 2019, is directed to a weather resistant temporary wall system and method useful for forming a temporary barrier during building construction or renovation includes a series of modular wall panels that may be removably fit together in the size needed. The wall panels have complimentary shaped edge profiles that form a protective barrier against water penetration. The wall panels may be assembled on site in vertically stacked relationship between a pair of support posts which extend from floor to ceiling. The side edges of the wall panels have edge profiles that are complimentary in shape to the side edges of the support posts such that the panels may be removably attached to the support posts. The wall panels may further include a string reinforced polyethylene material for increased strength.

U.S. Pat. No. 10,570,622 for roof assemblies, methods for their manufacture, and the use of such assemblies in a building by inventor Lambach et al., filed Nov. 5, 2018 and issued Feb. 25, 2020, is directed to prefabricated insulated roof assemblies, methods for manufacturing such assemblies, and use of these roof assemblies in a building. The assemblies include a sheathing panel, I-joists, and rigid foam insulation boards positioned in a cavity formed by the sheathing panel and the I-joists.

U.S. Pat. No. 8,555,581 for exterior wall finishing arrangement by inventor Amend, filed Jun. 21, 2011 and issued Oct. 15, 2013, is directed to a finishing arrangement for an exterior wall of a building includes a weather or water barrier against at least the exterior of the wall; an outer hardboard panel; an insulating foam panel between the weather or water barrier and the outer hardboard panel, the insulating foam panel attached to the outer hardboard panel and having drainage channels therein; and a drainage guide that extends from the weather or water barrier to at least the outer hardboard panel, for guiding moisture away from the wall.

U.S. Pat. No. 9,919,499 for stiffened frame supported panel by inventor Kreizinger, filed Oct. 28, 2016 and issued Mar. 20, 2018, is directed to frame supported panels with an increased load carrying capacity derived from inducing newly discovered conditions on panels made from weaker, lighter and thinner materials. The fixed/continuous/dropped condition can increase a panel's load capacity many times based on the panel's interaction with frame members. This enables foam panels, for example, to be used in structural applications. It also enables polyurethane foam with any cladding to provide a comprehensive, structural building panel that provides a finished exterior, continuous and cavity insulation, an air, moisture and vapor barrier and increased uplift resistance while eliminating condensation and thermal expansion/contraction.

US Patent Publication No. 2019/0309525 for pre-finished insulated panel system for cladding a building by inventor Santarossa et al., filed Apr. 5, 2018 and published Oct. 10, 2019, is directed to a pre-finished insulated panel system for cladding an exterior wall of a building, the system comprising: rectangular panels each with an insulation core and weather resistant coating defining a central portion with a panel thickness between an inside mounting surface and an exposed outside surface, the plurality of panels adapted for engagement in a series of parallel rows; each panel having: a mounting flange disposed on the top edge and on a first lateral edge of each panel, the mounting flange including: a recessed mounting groove; an inner ridge; and an outer ridge; an elongate cover flange complementary with the mounting flange disposed on the bottom edge and on an opposing second lateral edge, the cover flange including: an inner groove complementary to the inner ridge; and an outer groove complementary to the outer ridge; and mechanical fasteners within the recessed mounting groove and anchoring to the wall.

US Patent Publication No. 2019/0316352 for wall/roof construction system and related method by inventor Brooks, III, filed Sep. 21, 2019 and published Oct. 17, 2019, is directed to a wall or roof sheathing with purposefully overlapping barriers along at least one lateral edge, preferably along two adjacent lateral edges and, most preferably, along all four lateral sides to a given sheet product hereunder. This system has moisture permeability and results in an improved installation method. The system comprises both structural and nonstructural panels, either insulated or non-insulated, in the form of wall and/or roof sheeting.

U.S. Pat. No. 9,963,875 for exterior wall cladding system for buildings by inventor Prygon, filed Jul. 19, 2017 and granted May 8, 2018, is directed to exterior wall cladding system for application to an exterior wall surface comprises a sealed and laminated waterproof wrap applied to the exterior wall surface, a fully-sealed insulating panel without a drainage plane disposed over the sealed and laminated waterproof wrap, and a multi-layer stucco coating applied over the insulating panel. Sealing materials are applied to all openings through and edges of the wall structure.

US Patent Publication No. 2008/0245007 for gypsum wood fiber structural insulated panel arrangement by inventor McDonald, filed Apr. 4, 2007 and published Oct. 9, 2008, is directed to aa generally planar, structural insulated panel for building construction includes a pair of outer facings disposed on opposed surfaces of a plastic foam core. Both of the outer facings are gypsum cellulose fiber board such as gypsum wood fiber board. Disposed on the exterior surface of the gypsum wood fiber board on the exterior surface and between another expanded polystyrene insulation panel is a weather resistant barrier that is fastened to the gypsum wood fiber board. The exterior surface of the second insulation panel is fastened to the gypsum wood fiber board by mechanical fasteners. The insulation panels are then coated with a basecoat which has an embedded mesh reinforcement and then a finishing coat is applied to the base coating. Vinyl or aluminum metal siding can be fastened to the structural assembly by G screw fasteners or other mechanical fasteners U.S. Pat. No. 10,167,629 for insulated reinforced foam sheathing, reinforced elastomeric vapor permeable air barrier foam panel and method of making and using same by inventor Ciuperca, filed Sep. 19, 2017 and issued Jan. 1, 2019, is directed to a product comprising a first foam panel having an edge, a first primary surface and an opposite second primary surface and a second foam panel having an edge, a first primary surface and an opposite second primary surface, wherein the first and second foam panels are disposed such that their edges are adjacent each other and define a joint therebetween. The product also comprises an elongate metal strip having a body portion and a projection extending outwardly from the body portion, the metal strip being disposed such that at least a portion of the projection is disposed in the joint between the foam panels and at least a portion of the body portion covers a portion of the second primary surface of the first foam panel and a portion of the second primary surface of the second foam panel. A method of making and using the composite panel is also disclosed.

US Patent Publication No. 2010/0088970 for smart multifunction building panel by inventor Miller, filed Nov. 12, 2009 and published Apr. 15, 2010, is directed to a multifunctional panel for a building comprises an insulative body, an exterior surface, and an interior surface. A sensor is provided to measure an interior condition in the interior of the building and an exterior condition in the exterior of the building, and generate a sensor signal in response to the difference between the measured interior and exterior conditions. A signal coupler can transmit the sensor signal to other multifunctional panels, receive an input signal from another multifunctional panel, or pass power to power a device in or about the insulative body.

U.S. Pat. No. 6,588,172 for building panels with plastic impregnated paper by inventor Porter, filed Aug. 16, 2001 and issued Jul. 8, 2003, is directed to a generally planar, structural insulated panel for building construction including a pair of outer facings disposed on opposed surfaces of a plastic foam core. One of the outer facings is of a gypsum or cementous composite for use on the panel's inner surface, while the other outer facing is of oriented strand board (OSB) or other conventional building material which forms the panel's outer surface. Disposed between and laminated to the inner surface of the gypsum or cementous composite facing and the plastic foam core by a conventional bonding agent is a sheet of paper impregnated with urethane or polyisocyanurate plastic. The impregnated sheet of paper serves as a vapor barrier near the panel's inner surface to prevent moisture from permeating from the warm interior of the structure through the plastic foam insulation to the outside. The plastic impregnated sheet of paper bonded to the foam core and the panel's inner facing also substantially increases the tensile strength of the panel to withstand large transverse loads.

US Patent Publication No. 2017/0368785 for wall assembly by inventor Fox et al., filed Jan. 19, 2016 and published Dec. 28, 2017, is directed to a wall assembly is manufactured for supporting an exterior covering of a structure. The wall assembly includes a frame assembly including a top member and a bottom member spaced from the top member. The frame assembly further includes a plurality of vertical members spaced from each other and coupled to and extending between the top and bottom members. The plurality of vertical members each have an exterior surface configured to face an exterior of the structure. A rigid foam layer is directly coupled to the exterior surface of the plurality of vertical members. A sheathing layer is coupled to the rigid foam layer opposite the plurality of vertical members with the sheathing layer configured to receive the exterior covering.

SUMMARY OF THE INVENTION

The present invention relates to insulated building panels with integrated weather resistant barriers.

It is an object of this invention to provide insulated building panels that improve building energy efficiency and moisture and air control.

In one embodiment, the present invention includes an energy efficient insulated building panel including an insulation layer, a sheathing material, and a weather resistant barrier, wherein the insulation layer includes a foam insulator, wherein the foam insulator includes polyurethane, wherein the polyurethane foam insulator is configured to self-adhere to the sheathing material, and wherein the polyurethane foam insulator has a flame spread value between about 0 and about 25 as determined by the ASTM E84 procedure and a smoke developed value between about 0 and about 450 as determined by the ASTM E84 procedure.

In another embodiment, the present invention includes an energy efficient insulated building panel including an interior sheathing layer, an exterior sheathing layer, and an insulation layer, wherein the interior sheathing layer and the exterior sheathing layer include a weather resistant material, wherein the insulation layer is positioned between the interior sheathing layer and the exterior sheathing layer, and wherein the insulation layer includes a foam insulator, wherein the foam insulator is configured to self-adhere to the interior sheathing layer and the exterior sheathing layer.

In yet another embodiment, the present invention includes an energy efficient insulated building panel including an insulation layer, a sheathing layer, a weather resistant barrier, and a reinforcing member, wherein the insulation layer includes a foam insulator, wherein the foam insulator includes polyurethane, wherein the polyurethane foam insulator includes an R value between about R25 to about R72, wherein the polyurethane foam insulator is configured to self-adhere to the sheathing layer, wherein the weather resistant barrier and the sheathing layer comprise a single layer, and wherein the reinforcing member includes a multiplicity of holes to receive the polyurethane foam insulator.

These and other aspects of the present invention will become apparent to those skilled in the art after a reading of the following description of the preferred embodiment when considered with the drawings, as they support the claimed invention.

DETAILED DESCRIPTION

Figure 1:
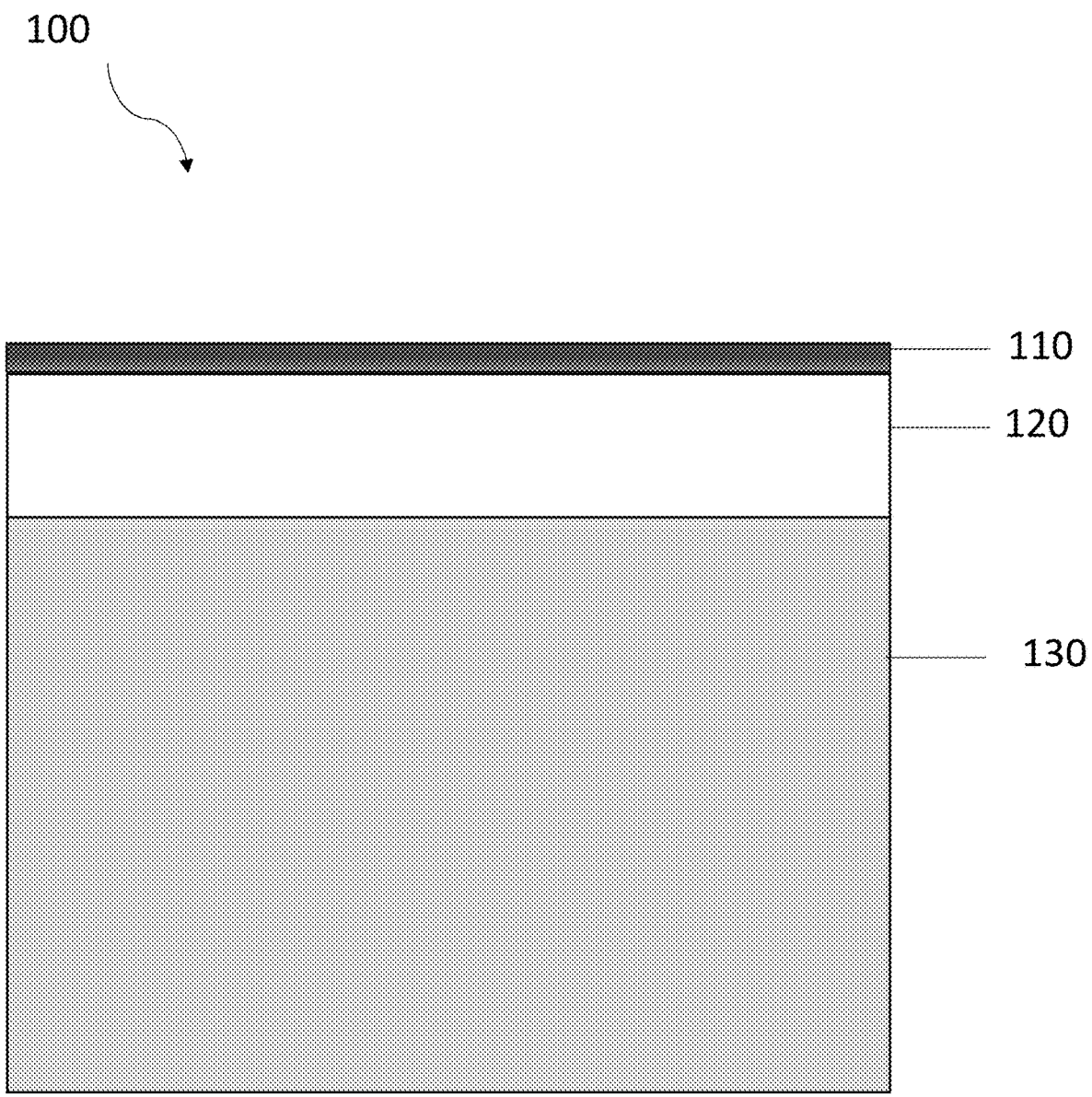
FIG. 1 illustrates layers of an insulated building panel according to one embodiment of the present invention.

The present invention is generally directed to insulated building panels with integrated weather resistant barriers.

In one embodiment, the present invention includes an energy efficient insulated building panel including an insulation layer, a sheathing material, and a weather resistant barrier, wherein the insulation layer includes a foam insulator, wherein the foam insulator includes polyurethane, wherein the polyurethane foam insulator is configured to self-adhere to the sheathing material, and wherein the polyurethane foam insulator has a flame spread value between about 0 and about 25 as determined by the ASTM E84 procedure and a smoke developed value between about 0 and about 450 as determined by the ASTM E84 procedure.

The energy efficient insulated building panel further includes a polyurethane foam insulator including an R value between about R15 to about R72. The polyurethane foam insulator further includes an R value between about R25 to about R72. The energy efficient insulated building panel further including wherein the sheathing material includes at least one of a gypsum material, a magnesium oxide material, or a cementitious material. The energy efficient insulated building panel further including wherein the sheathing material includes gypsum, wherein the panel further includes a fluid air barrier membrane. The energy efficient insulated building panel further including a gypsum sheathing board, wherein the gypsum sheathing board further includes an ultraviolent resistant membrane. The energy efficient insulated building panel further including at least one multi-laminar edge, wherein the at least one multi-laminar edge includes a male joint and a female joint, wherein the male joint is configured to connect to a female joint of a second insulated building panel. The energy efficient insulated building panel further including a reinforcing member, wherein the reinforcing member includes a multiplicity of holes to receive the polyurethane foam insulator. The energy efficient insulated building panel further including a reinforcing member, wherein the reinforcing member includes a plurality of channels, wherein the plurality of channels includes at least one of a thread rod channel, a slotted channel or a framing channel. The energy efficient insulated building panel further including wherein the panel is a corner wall panel, wherein the corner wall panel includes a continuously insulated seamless corner and a double rail mating alignment component. The energy efficient insulated building panel further including wherein the sheathing material and the weather resistant barrier are a single layer, wherein the weather resistant sheathing layer includes a fiber-reinforced plastic. The energy efficient insulated building panel further including wherein the polyurethane foam insulator further includes a refrigerant, wherein the refrigerant includes a hydrofluoroolefin. The energy efficient insulated building panel further including cross-laminated timber, wherein the sheathing is configured to attach to the cross-laminated timber. The energy efficient insulated building panel further including a roof panel, a skylight panel, a bead panel, or a ridge panel.

In another embodiment the present invention includes an energy efficient insulated building panel including an interior sheathing layer, an exterior sheathing layer, and an insulation layer, wherein the interior sheathing layer and the exterior sheathing layer include a weather resistant material, wherein the insulation layer is positioned between the interior sheathing layer and the exterior sheathing layer, and wherein the insulation layer includes a foam insulator, wherein the foam insulator is configured to self-adhere to the interior sheathing layer and the exterior sheathing layer.

The energy efficient insulated building panel further including wherein the foam insulator has a flame spread value between about 0 and about 25 as determined by the ASTM E84 procedure and a smoke developed value between about 0 and about 450 as determined by the ASTM E84 procedure. The energy efficient insulated building panel further including wherein the foam insulator includes an R value between about R25 to about R72. The energy efficient insulated building panel further including wherein the interior sheathing layer and the exterior sheathing layer include at least one of a gypsum material, a magnesium oxide material, or a cementitious material.

In yet another embodiment, the present invention includes an energy efficient insulated building panel including an insulation layer, a sheathing layer, a weather resistant barrier, and a reinforcing member, wherein the insulation layer includes a foam insulator, wherein the foam insulator includes polyurethane, wherein the polyurethane foam insulator includes an R value between about R25 to about R72, wherein the polyurethane foam insulator is configured to self-adhere to the sheathing layer, wherein the weather resistant barrier and the sheathing layer comprise a single layer, and wherein the reinforcing member includes a multiplicity of holes to receive the polyurethane foam insulator.

The energy efficient insulated building panel further including wherein the sheathing layer includes gypsum, wherein the panel further includes a fluid air-barrier membrane.

None of the prior art address the longstanding need for stable, energy efficient insulated building panels with an integrated weather resistant barrier. Particularly, prior art fails to provide a high R-value insulated building panel with an integrated weather resistant barrier.

Building envelopes need layers that serve primary barrier control functions: air, water vapor, and thermal. Controlling air and moisture in both liquid and vapor forms are essential functions to create an effective building envelope. Typically, water moves through building envelopes by means of four primary mechanisms: water leaks, vapor flow by air leaks, diffusion, and capillary suction. A water resistive barrier is needed on the weather side of the building envelope to address the movement of water. The water resistive barrier must drain all water down and away from the exterior of the building envelope. In addition, the water resistive barrier must cover the entire building envelope to prevent water from draining into the interior. However, installation is a problem for many contractors as the water resistive barrier layer can be difficult and time-consuming to install and can come loose due to wind if improperly installed. Creating an air-tight building envelope is also a challenge for contractors with the materials and processes currently utilized in the construction industry. An air-tight building envelope is highly desirable as air-tight building envelopes reduce energy consumption and demand on HVAC systems, improve indoor air quality, and increase the durability of the building envelope. In addition, buildings typically have energy loss at openings, transitions, joints, and penetrations, so a preferred insulated building panel includes a continuous application of an air barrier system. While materials with low air permeance are effective at creating air tight building envelopes, these materials are often cumbersome and time-consuming to install.

One method of expediting the construction of a building includes utilizing panels in place of traditional site-built stud framed techniques. However, wall and roof panel systems are generally energy inefficient and are difficult to install or assemble. Installation or assembly of these systems usually requires additional steps involving materials other than the panels to prevent heat, air, and moisture transfer through the panels. Additionally, these panels do not include material sufficient to create an effective water or air barrier when assembled. Therefore, a weather resistant barrier is often added to panel systems or other construction by unrolling a housewrap and spreading it over the sheathing external surface, and attaching the housewrap to the sheathing of the panels or other components with staples or nails. The housewrap is difficult to install because it is typically provided on large rolls that are hard to maneuver, especially on scaffolding or in windy conditions.

Housewrap is designed to allow for the escape of water vapor, but typical housewraps are fastened at specific points which creates pockets or voids between the sheathing and the housewrap. In turn, moisture builds up and often leads to mold growth or rotten wood. This causes an issue as most oriented strand board (OSB) will warp and swell in response to the moisture exposure. Furthermore, these gaps cause thermal bridging, leading to energy inefficient structures. As discussed above, housewrap has to be properly secured to the structure so the housewrap does not blow off in windy conditions. This requires the housewrap to be lapped properly and taped or sealed to create effective water and air control layers. Contractors have to take more time to properly secure the housewrap, which delays construction and incurs additional costs.

An alternative to housewrap is sheathing with an integrated weather resistant barrier (WRB). Sheathing typically contains OSB or foam. OSB is very minimally insulating and can rot if exposed to moisture. Foam is insulating and does not rot, but it does not provide adequate structural support. OSB sheathing can have swelling at its edges but it provides strong structural support. However, OSB sheathing does not breathe or redistribute water as well as plywood. Therefore, if the OSB board gets wet then the OSB will not dry effectively, which could lead to rotting. To improve the drying of OSB, typically cavity insulation and a housewrap are used to create an air gap. However, this leads to the problems described above with housewrap.

A problem in dealing with typical sheathing panels is that tape is required to seal the sheathing panels and to hold the weather-resistant barrier in place. To create an effective seal, the tape must be installed carefully and cannot be directly exposed to frost or moisture. Furthermore, the water-resistant characteristics rely on the sealing tape adhesive that seals the joint, so the panels are at risk of exposure to moisture if the tape adhesive is not sufficiently strong or has a short effective life. The tape adhesive will also most likely lose its strength over time, requiring repairs to the structure. In addition, the horizontal seams are vulnerable to water penetration if the tape fails. Typically, when there is not a designed drainage plane, vertical spacers or a second layer of housewrap are required to create a drainage plane. An additional problem is that if nails are overdriven, the OSB is exposed through the sheathing and additional tape or sealant is needed to protected the OSB from moisture.

Foam sheathing is impermeable to vapor but does not provide significant shear or racking structural resistance. Panels with foam sheathing can have the joints taped or sealed, but do not need to be covered with housewrap or building paper. Foam sheathing panels with joint treatment can provide a high insulation value and avoid the problem of rotting wood. However, due to the lack of structural strength of foam sheathing, the sheathing needs support to counteract shear stress. One potential solution is pre-manufactured metal inset shear panels. However, metal inset shear panels include metal, which increases thermal bridging and therefore decreases the energy efficiency of the structure. Another problem is the water vapor impermeability of foam sheathing. Condensation from interior moisture laden air needs to be controlled. This is typically controlled by increasing the thermal resistance of the foam sheathing to be high enough to limit the condensation. Environmental factors such as climate and location can affect the amount of foam needed. Lastly, foam sheathing requires control over hydrostatic pressure, so a water control layer is needed and an air-gap between the insulation and cladding is needed to drain moisture.

There is therefore a long-felt, unmet need for highly insulated building panels with an integrated weather resistant barrier that is easily installed, eliminates gaps for moisture build up, reduces thermal bridging, and reduces the amount of moisture penetrating through a structure and the components of the structure such as panels and a higher insulation value decreases the chance for the forming of condensation which can lead to mold spores or other toxic growths within the building envelope.

Referring now to the drawings in general, the illustrations are for the purpose of describing one or more preferred embodiments of the invention and are not intended to limit the invention thereto.

The present invention provides a building system including at least one insulated building panel. In one embodiment, the at least one insulated building panel includes insulation, sheathing and a weather resistant barrier. In one embodiment, the sheathing and the weather resistant barrier are included in a single layer, such as fiber-reinforced plastic. In a preferred embodiment, the insulation includes foam. The insulated building panel includes R values from R15 to R72 as measured by varying environmental conditions. R values are the thermal resistance of the insulated building panels. In another embodiment, the panel includes a total assembly effective R-value between R25 and R72. Alternatively, the foam has an R value between from R1 to R14. The tight interconnection of the insulated panels prevents air leakage in a building. Advantageously, a desirable physical property of the foam insulation is to increase in R value as temperature decreases, thereby, increasing thermal resistance and energy efficiency as the temperatures drops.

FIG. 1 illustrates the structural layers of an insulated building panel according to one embodiment of the present invention. The insulated building panel 100 includes a weather resistive barrier 110, a sheathing material 120, and an insulation layer 130. In another embodiment the sheathing material 120 is lignin-based.

In one embodiment, the sheathing material 120 is a gypsum or magnesium oxide or cementitious or other non-organic based rigid sheathing material. In another embodiment, the insulation layer 130 includes closed cell polyurethane foam. Advantageously, the closed cell polyurethane foam is fire-retardant and does not include ozone depleting potential (ODP), has zero global warming potential (GWP), zero styrenes, zero formaldehydes, and emits zero volatile organic compounds (VOCs). Global warming potential (GWP) is a measure of how much a greenhouse gas traps in the atmosphere up to a specific time horizon, relative to carbon dioxide. GWP compares the amount of heat trapped by a certain mass of a substance compared to the amount of heat trapped by a similar mass of carbon dioxide. Ozone depleting potential (ODP) is the amount of degradation to the ozone layer a substance can cause in relative amount to trichlorofluoromethane (R-11 or CFC-11). In yet another embodiment, the foam includes a refrigerant that acts as a catalyst that increases the energy efficiency of the foam. In one embodiment, the refrigerant is a hydrofluroro-olefin (HFO) that has a low GWP, is nonflammable, VOC-exempt and non-corrosive. In another embodiment, the refrigerant is similar to Solstice® by Honeywell®.

In one embodiment, the polyurethane foam has an aged R value of 7/in at 52° F., and performs at R-8 value at 13° F. Furthermore, the insulated building panel 100, which includes closed-cell polyurethane foam, is advantageous over the prior art because the insulated building panel 100 does not require a separate adhesive to bond with the sheathing material 120. Rather, the closed-cell polyurethane foam adheres to the sheathing material 120 after the foam is injected and while the foam cures. This creates a stronger bond between the insulation layer 130 and the sheathing material 120 and it eliminates delamination that typically occurs when gluing in a separate process. Furthermore, the polyurethane foam is advantageous over polyisocyanurate foam because the polyisocyanurate foam decreases in thermal resistance as the temperature falls whereas the polyurethane foam includes in thermal resistance as the temperature falls.

In embodiments where the sheathing material 120 and weather resistant material 110 are the same layer, the insulated building panel 100 does not require any additional adhesives between the layers. This allows for easy installation compared to prior art that requires wrapping a building or nailing building paper to a panel. In addition, this solves the prior art problem of relying on correct application of tape and trusting that the adhesive strength of the tape will last. Furthermore, the present invention reduces the opportunities for error during the manufacturing process (ex. imperfect glue, a poor volume to surface area ratio, and/or incorrect temperature).

In one embodiment, the insulated building panel includes caulk at its corners to reduce thermal bridging. In contrast to certain commercially used foams, such as polyisocyanurate foam, the R value (thermal resistance) of closed cell polyurethane increases as the temperature decreases. In another embodiment the foam insulation is formulated to increase in R value as external temperature increases towards to 75° F. In yet another embodiment, the foam insulation is formulated to increase in R value as external temperature increases towards 75° F. and to decrease in R value as external temperatures increases above 75° F.

In another embodiment, the closed cell polyurethane foam is injected into an open cavity in the building panel during the manufacturing process. The polyurethane foam expands at high pressure and fills out the building panel at a high density. The polyurethane foam entirely surrounds outlets, window, door framing and other features of the building panel. The foam is rated at about R7 per inch of thickness at 52° F. In another embodiment, the building panel includes OSB sheathing and a 4.5" panel with the OSB sheathing, that has a thermal resistance value of R26 or a 6.5" panel with a thermal resistance value of R40. The building panel includes sheathing on both sides of the building panel. Furthermore, there is no vertical stud or any type of stud in the insulated building panel except as specifically requested by the client. The absence of a stud is advantageous because studs wick thermal energy from the exterior to the interior of the structure when the external temperature is greater than the internal temperature. The studs further wick thermal energy from the interior to the exterior when the internal temperature is greater than the external temperature. Therefore, the present invention is an improvement over prior art as it is more energy efficient.

In another embodiment, the closed cell polyurethane foam has a typical density between 2.2-2.4 lb/ft$^3$, a compressive strength (@ 10% deformation) of 35 psi, a tensile strength of 58 psi, a thermal resistance per one inch of thickness at 75 deg. F. of approximately 6.9° F.*ft$^2$/Btu, a water vapor permeance of approximately 2, is nonflammable, and chars at 800° F. An insulated building panel with a thickness of 4½" including closed cell polyurethane foam and OSB siding on both sides of the insulated building panel can support a compressive load of lbs.

In yet another embodiment, the closed cell polyurethane foam is configured for a flame spread value of less than or equal to 25 as defined by the ASTM E84 procedure. The closed cell polyurethane foam further includes a smoke developed value of less than or equal to 450 as defined by the ASTM E84 procedure. The closed cell polyurethane foam has a core density of 2.26 lb/ft$^3$, a flexural strength of 39 psi, a shear strength of 37 psi, a tensile strength of 64 psi, a K-Factor @ 75 deg. F. degrees mean of 0.144 Btu*in/(hr*ft$^2$*deg. F.), a K-Factor @ 55 deg. F. mean of 0.139 Btu*in/(hr*ft$^2$*deg. F.), and a K-Factor @ 20 deg. F. mean of 0.125 Btu*in/(hr*ft$^2$*deg. F.)

In one embodiment, sheathing is bonded on the exterior of a rigid foam insulation panel. The building system includes a water-resistive and air barrier and continuous insulation. The building system includes ½", 1", 1½", and/or 2" thick foam insulation panels. The system further includes OSB. The adhesives used to create the OSB include phenol formaldehyde (PF) and isocyanate resins. The PF resins are exposed to heat and pressure that cure the resins. The sheathing is used with wall panels and with wood-framed shear walls. A fastener is not required to attach the sheathing because the foam is poured over the panel and the foam is self-adhering. The sheathing includes a vapor permeable water-resistive and air barrier that eliminates the need for housewrap. The vapor permeable water-resistive and air barrier deflects rain and is resistant to vapor passing onto the OSB. The semi-permeable nature of the water-resistive barriers allows for the OSB to dry out if it gets wet. Advantageously, the water-resistive barrier covers the entire building envelope, thereby improving energy efficiency and reducing HVAC system power consumption, as well as increasing comfort for users of the structure. In another embodiment, the building panels of the present invention are configured for a 7/16" roof and wall panel. In yet another embodiment, the building system includes a 5/8" or a 1/2" roof panel and a 7/16" wall panel. In one embodiment, the building system includes a 1/2" a roof panel with a 1/2" or 5/8" wall panel.

Alternatively, the sheathing layer includes material similar to U.S. Pat. No. 9,234,355, which is incorporated by reference in its entirety.

In yet another embodiment, the sheathing panel is a gypsum sheathing panel. The gypsum sheathing panel includes a fluid air-barrier membrane. The fluid air-barrier membrane is applied on an exterior surface of the sheathing panel. Advantageously, the fluid air-barrier is continuous and deflects incidental water to wall exterior. The sheathing panel is configured to support substrate movements, seal substrate expansion and control joints, support construction material changes, and prevent air leakages.

In yet another embodiment the air and water resistive sheathing panel includes a gypsum sheathing board with an ultraviolet (UV) resistant synthetic polymer membrane. Advantageously, the air and water resistive sheathing panels of the present invention have a maximum air permeance of 0.004 cfm/sq. ft. of surface area at 1.57 lbf/sq. ft. (0.02 L/s×sq. m of surface area at 75 Pa) pressure difference, a water vapor permeance between 1.0 and 10 perms, a VOC content of 50 g/L or less, and an ultraviolet and a weathering resistance of at least 12 months.

Alternatively, the present invention includes an air and water barrier such as ExoAir®, Tyvek®, or StoGuard®. In one embodiment, the air and water barrier includes high-density polyethylene fibers that are fused together. In another embodiment, the air and water barrier include silyl-terminated polyether material.

Figure 10:
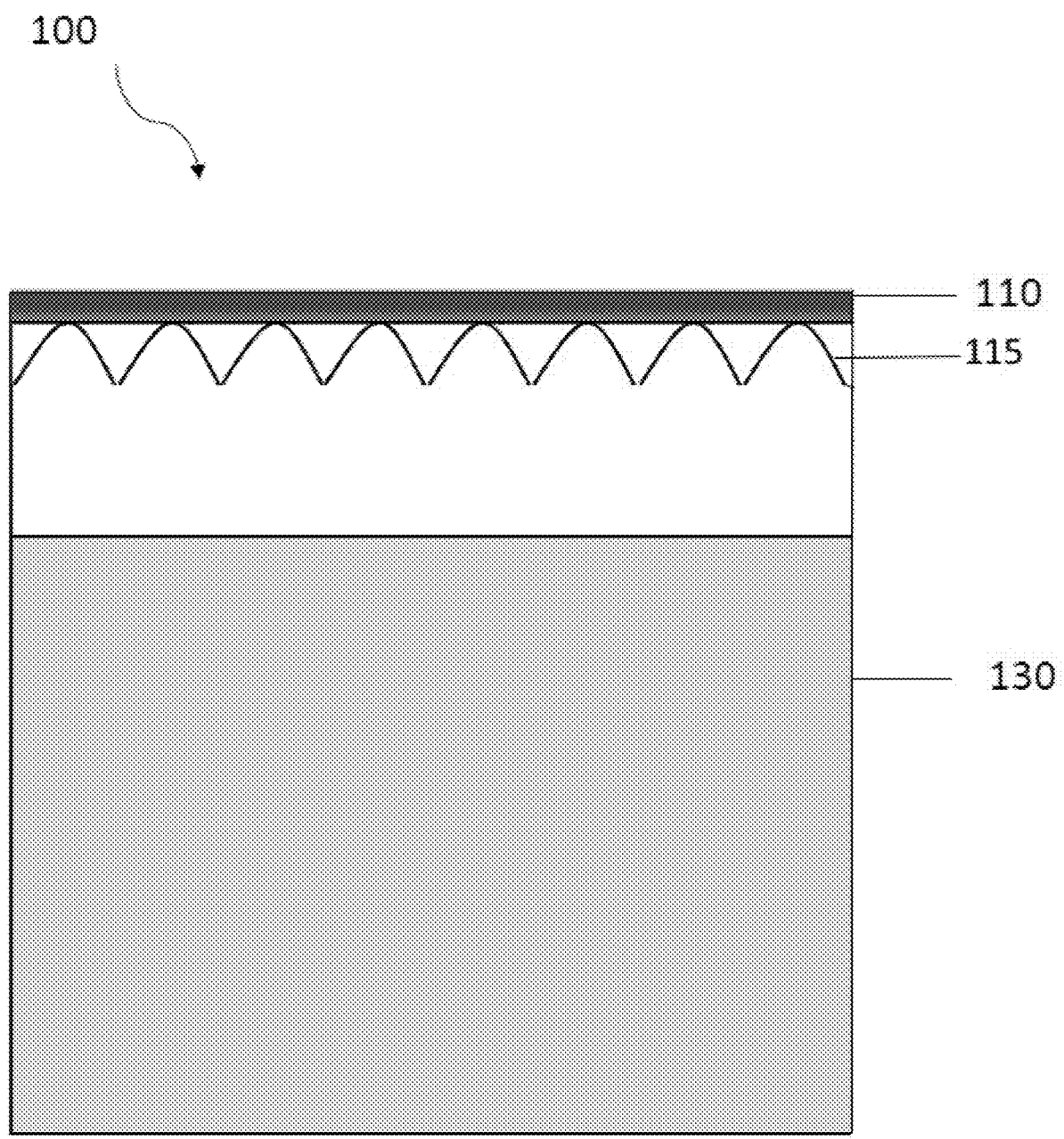
FIG. 10 illustrates layers of an insulated building panel including a drainage gap according to one embodiment of the present invention.

In another embodiment, the insulated building panel includes a drainage plane. The insulated building panel has a corrugated, ridged, grooved, or similar surface that provides a gap when the panel is wrapped or layered with a weather resistant barrier. The gap allows for moisture to drain. FIG. 10 illustrates layers of an insulated building panel including a drainage gap according to one embodiment of the present invention. The insulated building panel 100 includes a weather resistive barrier 110, a corrugated surface 115 defining a drainage plane including a gap between the panel and the weather resistive barrier 110, and an insulation layer 130. In another embodiment, the insulated building includes a material on its backside that creates an air gap. In yet another embodiment, the insulated building panel includes a preset form that is attached to the back side of the insulated building panel. The preset form includes grooves that allows draining to occur; in addition, the present form is customizable to adapt for multi-layer building envelopes. Advantageously, the customization allows the preset form to uniquely adapt to each building envelope in anticipation of where the structure will experience failures due to weather elements.

Figure 2:
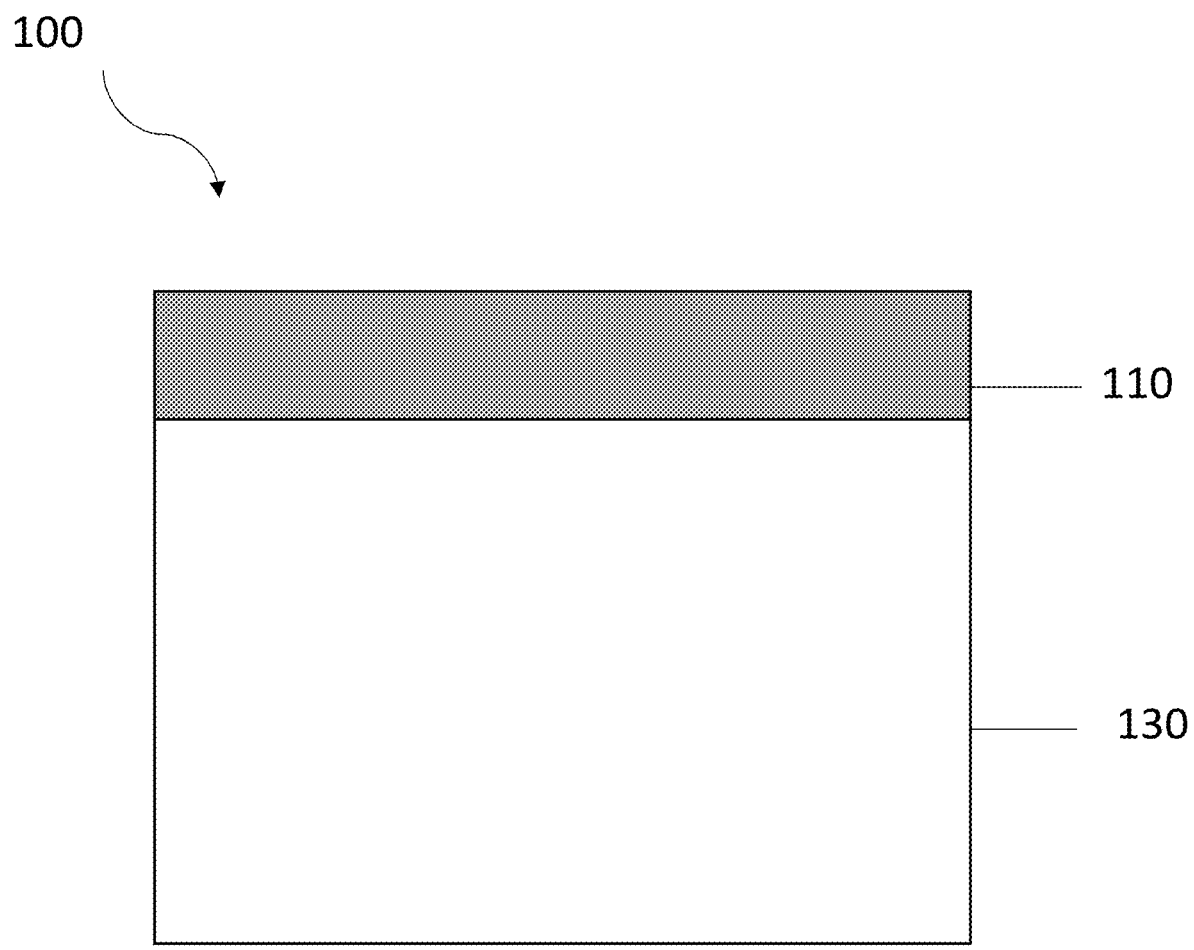
FIG. 2 illustrates layers of an insulated building panel according to one embodiment of the present invention.

FIG. 2 illustrates the structural layers of an insulated building panel according to one embodiment of the present invention. The insulated building panel 100 includes a weather resistive barrier 110, and an insulation layer 130. In one embodiment, the weather resistive barrier 110 is a non-permeable rigid material (ex. fiber reinforced plastic). The non-permeable rigid material resists racking, bending, and/or compression when used in conjunction with the insulation layer 130. Accordingly, the weather resistive barrier 110 of FIG. 2 does not require a separate sheathing layer. Rather, the weather resistive barrier 110 of FIG. 2 also acts as a sheathing layer. In one embodiment, the insulation layer 130 is a closed cell polyurethane foam.

Figure 3:
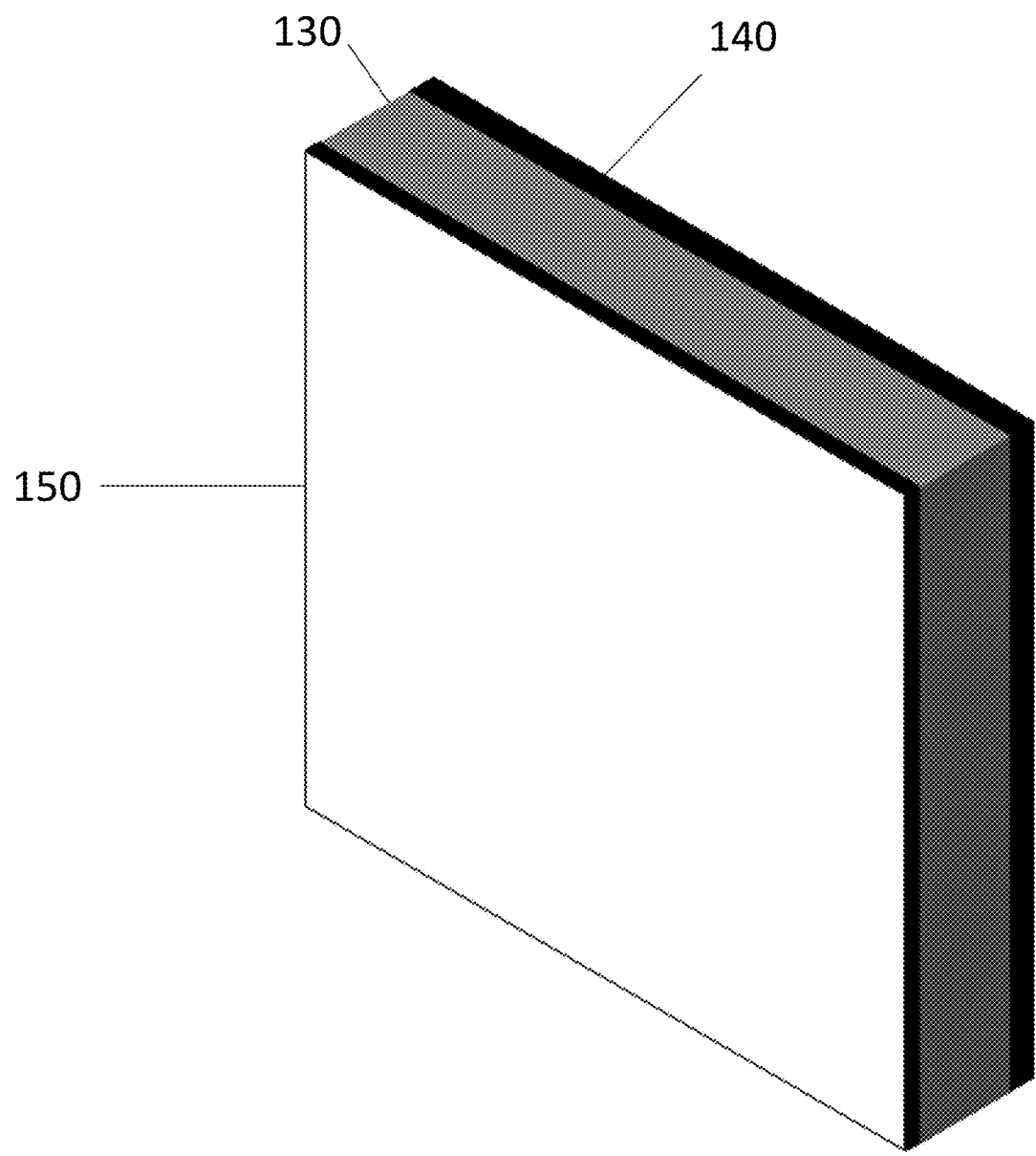
FIG. 3 illustrates an insulated building panel according to one embodiment of the present invention.

FIG. 3 illustrates a structural insulated panel according to one embodiment of the present invention. The structural insulated panel includes an insulation layer 130, an interior sheathing 140 and an exterior sheathing 150. In one embodiment, the insulation layer 130 includes closed cell polyurethane foam. The interior sheathing 140 and exterior sheathing 150 are constructed using any sheathing materials and/or weather resistive barrier materials referenced herein.

Figure 4A:
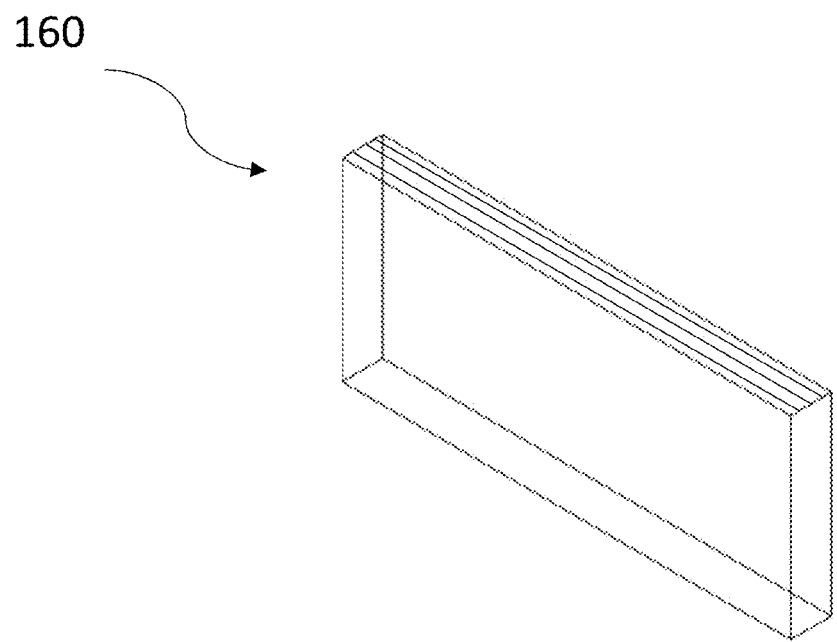
FIG. 4A illustrates a roof panel according to one embodiment of the present invention.
Figure 4B:
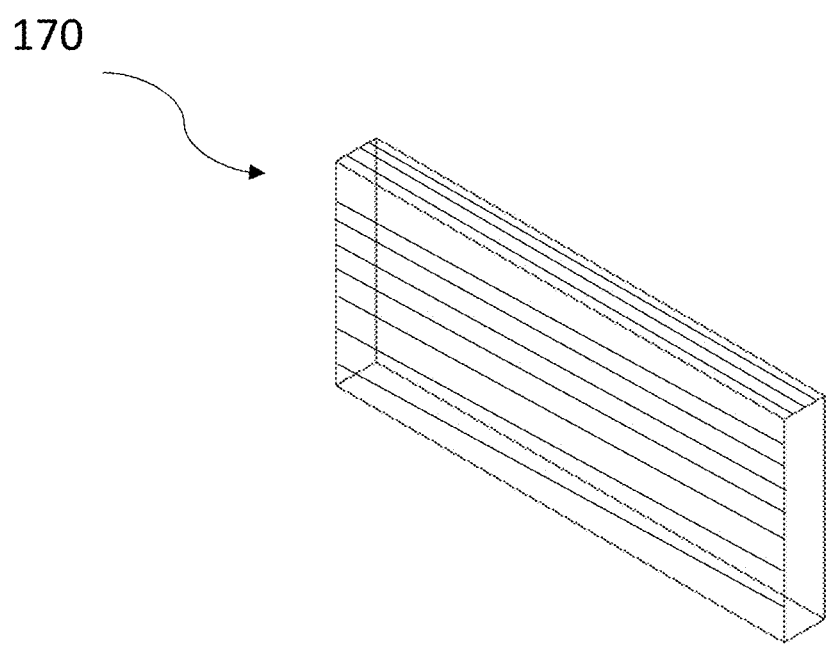
FIG. 4B illustrates a structural bead board panel according to one embodiment of the present invention.
Figure 4C:
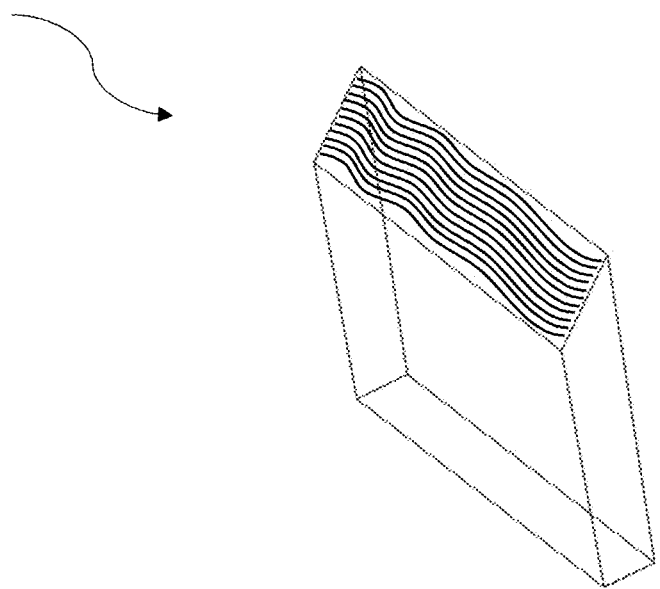
FIG. 4C illustrates a ridge panel according to one embodiment of the present invention.
Figure 4D:
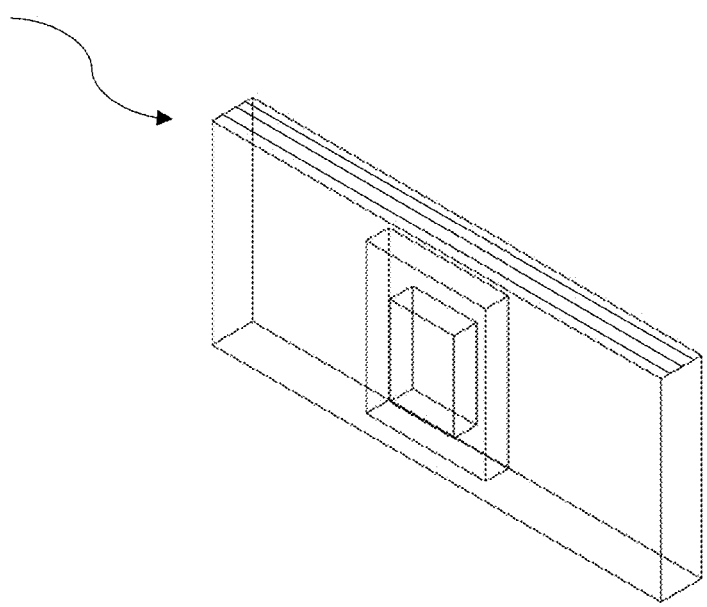
FIG. 4D illustrates a skylight panel according to one embodiment of the present invention.

FIG. 4A illustrates a roof panel 160 according to one embodiment of the present invention. FIG. 4B illustrates a structural bead board panel 170 according to one embodiment of the present invention. FIG. 4C illustrates a ridge panel 180 according to one embodiment of the present invention. FIG. 4D illustrates a skylight panel 190 according to one embodiment of the present invention.

Figure 5:
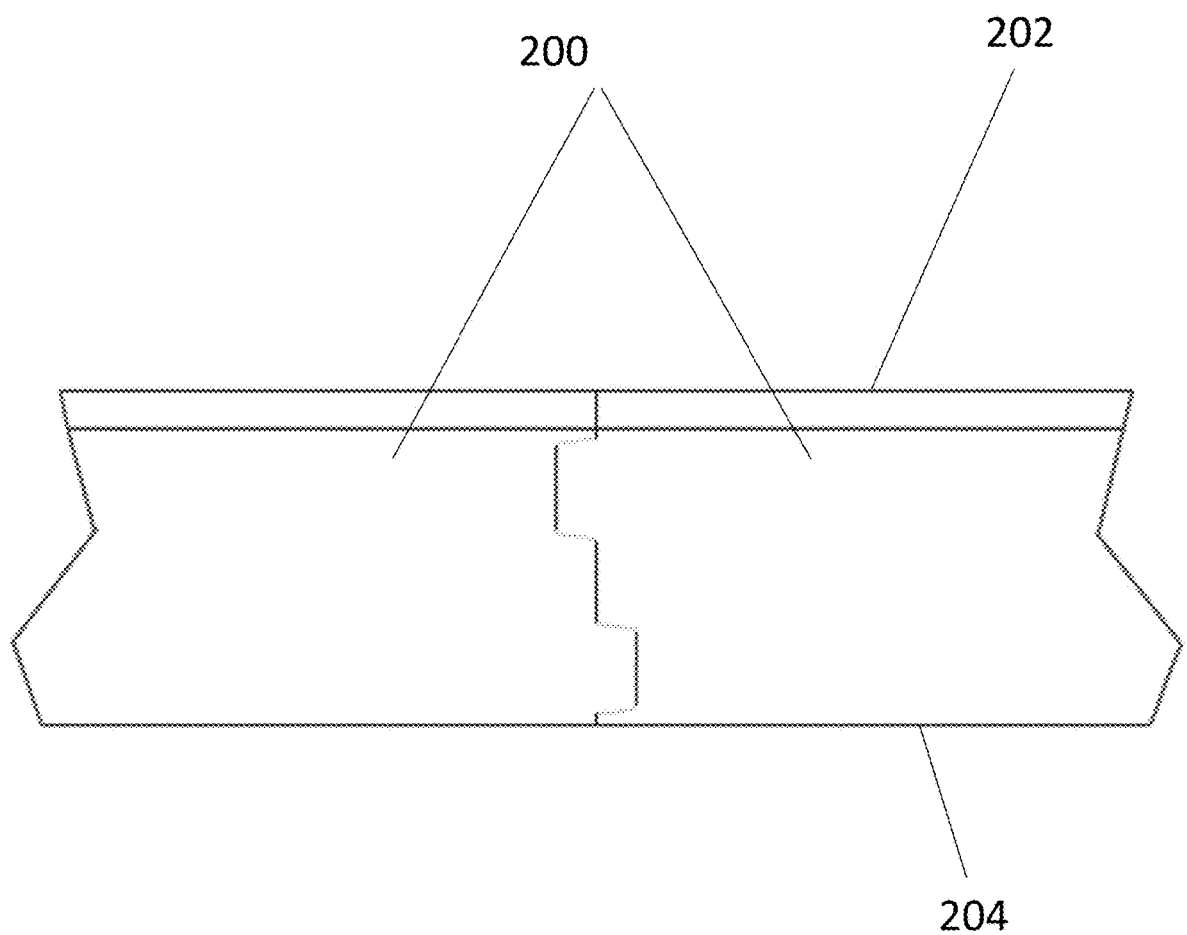
FIG. 5 illustrates panels joined at multi-laminar edges according to one embodiment of the present invention.

FIG. 5 illustrates panels joined at multi-laminar edges according to one embodiment of the present invention. When joined together, the multi-laminar edges 200 act as a thermal barrier, a vapor barrier, an air barrier and a water barrier as well as a sound barrier. Advantageously, the multi-laminar edges 200 include male and female joints so multiple building panels can be interlocked. This interlocking slows down or eliminates airflow and/or moisture penetration at the seam. The multi-laminar edges 200 include a male and female portion, wherein the distance from the male portion and the first side 202 is approximately the same distance between the female portion and the second side 204. As depicted in FIG. 5, a female portion of the multi-laminar edge of a panel is offset from a top edge 202 of the panel and angled relative to the base of the multi-laminar edge. Similarly, the male portion of the multi-laminar edge of the panel is offset from the female portion of the multi-laminar edge of the panel and a bottom edge 204 of the panel and is trapezoidal in shape and angled relative to the base of the multi-laminar edge. The placement of the male portion of the multi-laminar edge of the panel and the female portion of the multi-laminar edge of the panel are also operable to be reversed relative to the prior description. The multi-laminar edges are adaptable to insulated building panels of multiple sizes. In another embodiment, the insulated building panels include at least one multi-laminar edge. A first insulated building panel is configured for the inverse placement of male and female portions on the multi-laminar edges to interlock with a second insulated building panel. In yet another embodiment, the insulated building panel includes two, four, six or eight or similar combinations of multiple male and female connectors spaced at a consistent distance apart so as to ensure inter-operability and connectivity with any other panel. For additional information regarding multi-laminar edges, see U.S. Pat. Nos. 8,539,732, 8,590,264, and 8,869,492, which are incorporated herein by reference in their entirety.

Figure 6:
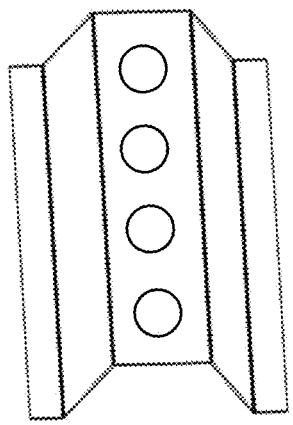
FIG. 6 illustrates a structural reinforcing member according to one embodiment of the present invention.

In another embodiment the sheathing and the weather resistant barrier are the same. In one embodiment, the sheathing is attached to the panels in a discontinuous process. Each sheathing sheet has its own form and the edges are waxed or treated with a similar release agent so the foam insulation doesn't adhere to it. In one embodiment, the discontinuous process includes a low density pour-in place rigid polyurethane foam system that is hydrofluoroolefin (HFO)-blown and uses polymeric methylene diisocyanate (PMDI). Alternatively, the sheathing is applied through a continuous process. In the continuous process, a line of sheathing is spaced on a conveyor belt wherein the sheathing is layer over an insulated building panel. During the manufacturing process the sheathing having an integrated weather resistive barrier is assembled into a hollow cavity having an interior thickness equal to the desired ultimate thickness of the cured foam insulation, and then foam insulation is injected into the panel. The foam has excellent expansive properties and expands once injected inside the building panel. The foam fills cavities inside the building panel. In one embodiment, the insulated building panel includes a reinforcing member 210 as illustrated in FIG. 6. In one embodiment, the reinforcing member includes holes to allow for foam to fill the cavity inside. The reinforcing member prevents the insulated building panel from bowing when the foam is expanding after injection. In yet another embodiment, the reinforcing member is a series of threaded rod and metal channels, a slotted strut channel or a Unistrut® framing channel.

In yet another embodiment, the panels are configured to meet a desired thickness. Higher thickness improves the structural strength and/or sound attenuation of the panels. In addition, increasing the thickness results in a reduction of impact related sounds.

In yet another embodiment, the building panel is a nail base panel. The nail base panel has sheathing with insulation already attached to one side and a weather resistant barrier on the other side and there is no second layer of sheathing in the panel assembly. In one embodiment, 3-ply thick 2×4 s, known as cross-laminated timber or CLT, are used to create strong wall and roof panels in place of a traditional piece of sheathing. The polyurethane foam is poured over sheathing and is self-adhering to the sheathing. Advantageously, the sheathing with foam insulation on one side is configured to attach to a continuous layer or non-continuous layer of cross-laminated timber. The insulated building panels of the present invention are operable to be attached to cross-laminated timber via adhesive, screws, or any other mechanical or chemical fastener known in the art. In another embodiment, the insulated building panel includes a CLT skin on at least one side of the panel. The CLT skin insulated building panel provides high shear and compressive strength will maintaining a high-insulation value due to the foam insulation. In yet another embodiment, the CLT skin insulated building panel includes a weather resistant barrier, wherein the weather resistant barrier includes a drainage plane to prevent moisture from getting behind the foam insulation.

Figure 7:
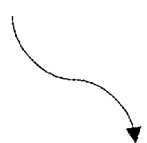
FIG. 7 illustrates a cross laminated timber panel according to one embodiment of the present invention.
Figure 7:
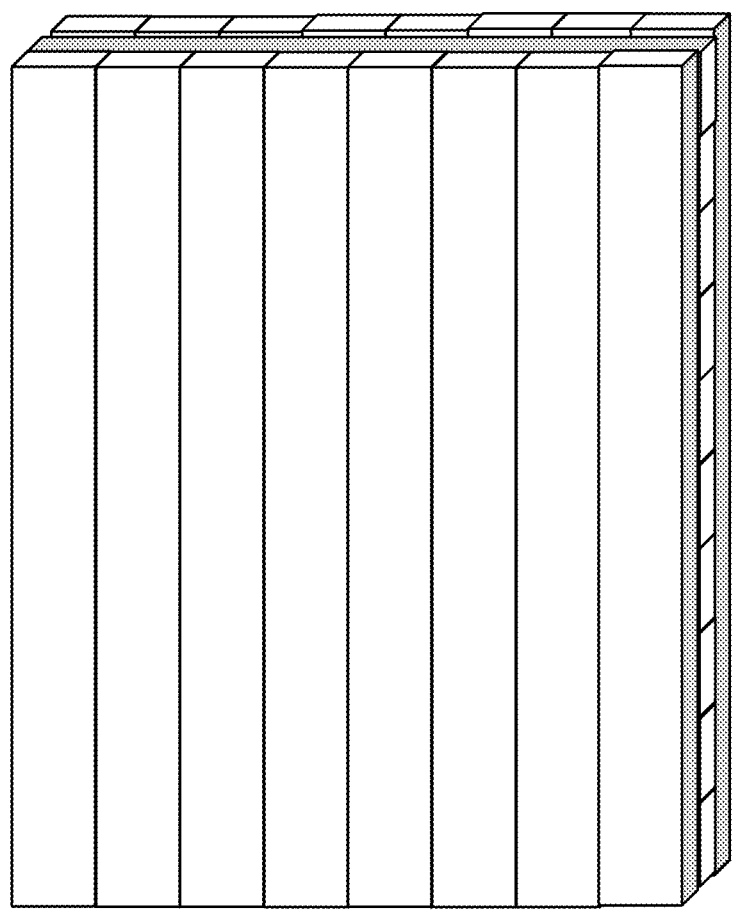
Figure 8:
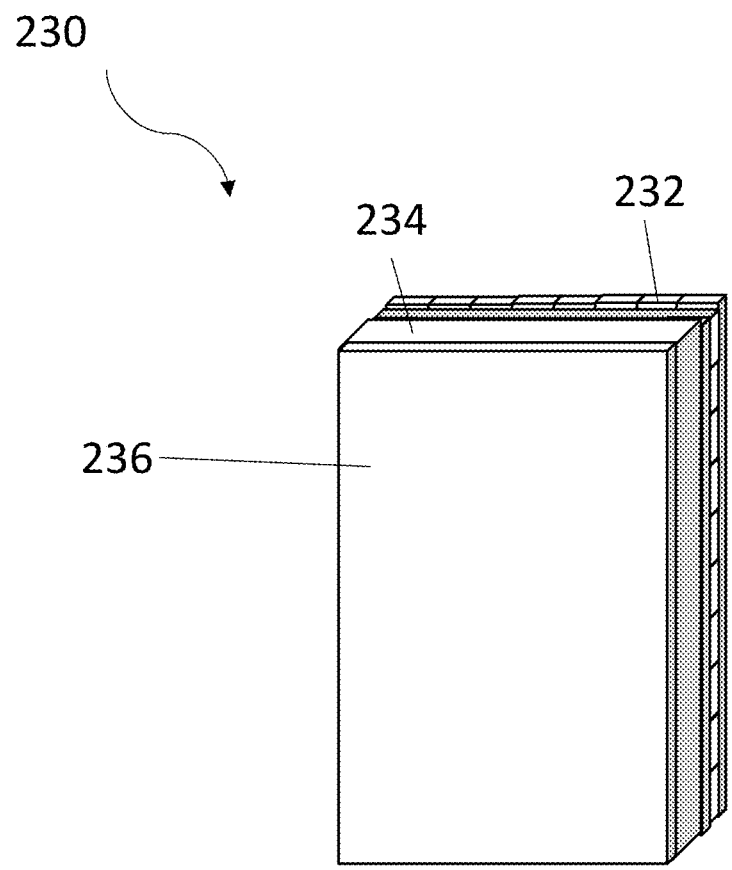
FIG. 8 illustrates an insulated building panel layer according to one embodiment of the present invention.
Figure 9:
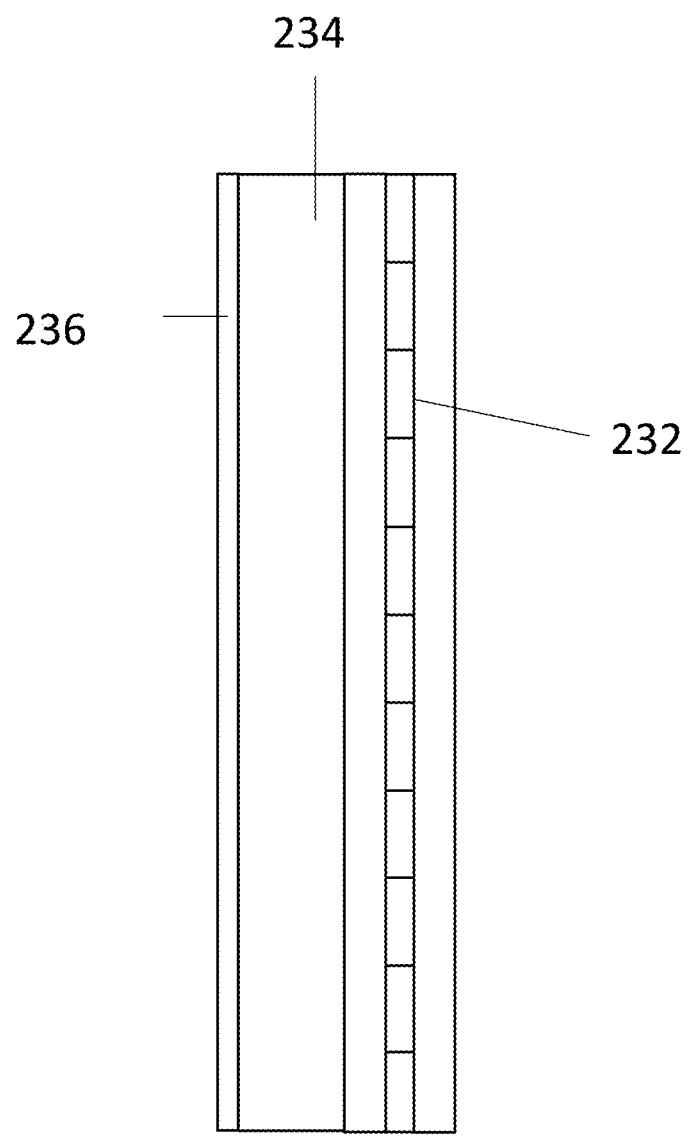
FIG. 9 illustrates a side view of an insulated building panel according to FIG. 8.

FIG. 7 illustrates a cross laminated timber panel 220 according to one embodiment of the present invention. FIG. 8 illustrates an insulated building panel 230 according to one embodiment of the present invention. The insulated building panel includes a cross laminated timber layer 232, a foam insulation layer 234, and a weather resistant barrier sheathing layer 236. FIG. 9 illustrates a side perspective of an insulated building panel according to FIG. 8.

In one embodiment, the present invention includes a water and air resistant building panel with siding. The water-resistant panel is highly resistant to floodwater damage, including damage caused by moving water. The water-resistant panel includes siding (ex. LP® SmartSide® or Huber AdvanTech™) that provides sufficient water resistance to the floodwater. In one embodiment, the water-resistant panel is wood-based. Advantageously, this allows the water-resistant panel to be workable by most tools on a jobsite. In one embodiment, the siding comprises wood strands that are coated with wax and bonded with resin. The water-resistant panel meets the NFIP regulations for flood damage-resistant materials. Advantageously, the insulated building panel includes closed cell polyurethane foam. Closed cell polyurethane foam is approved for both floors and walls/ceilings for floodplain panels. The closed cell polyurethane foam is impermeable to moisture, which protects the wood. In yet another embodiment, the insulated building panel includes pressure treated strand board (ex. zinc borate infused OSB) or marine grade plywood. In another embodiment, the present invention includes a hurricane panel. The hurricane panel includes hurricane straps or ties integrated into the structure of the panel as required by the specific design. The hurricane straps are made of steel most commonly but can also be made from carbon fiber, Kevlar or other synthetic or composite type straps. For additional details, see U.S. Pat. No. 10,787,803, which is incorporated herein by reference in its entirety.

In another embodiment, the present invention includes an insulated cladding panel. The insulated cladding panel adds insulation to an existing structure and is manufactured in a variety of thicknesses. The insulated cladding panel includes a substrate (ex. OSB) on one side. The substrate is usable for shingle and siding applications. In one embodiment, the panels have R-7 per inch of thickness at approximately 52° F., have a panel length up to 24' and a panel width up to 4'. In another embodiment, the insulated cladding panels include polyurethane foam injected at a density of 2.5 lbs per cubic foot.

In another embodiment, the present invention includes a corner wall panel with a continuously insulated seamless corner with insulation, a face side and a back side of the wall panel and double rail mating alignment components. In addition, the insulated building panels include a cam-lock mechanism for improved attachment between panels. This allows for a multiplicity of panels to combine to create an entire building structure and improves the energy efficiency of buildings created using the insulated building panels of the present invention. For additional details, see U.S. Pat. No. 10,787,803, which is incorporated herein by reference in its entirety.

Advantageously, the building panel is used for homes, apartments, cottages, and for both temporary structures and permanent structures. Furthermore, the insulated building panels are operable to be a variety of shapes. For example, and not limitation, the insulated building panels are rectangular or tessellate shapes in one embodiment.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. An energy efficient insulated building panel comprising:
   an insulation layer;
   a rigid sheathing material; and
   a weather resistant barrier;
   wherein the panel includes a drainage plane;
   wherein the insulation layer includes a foam insulator
      wherein the foam insulator includes polyurethane;
   wherein the polyurethane foam insulator is self-adhered to
      the sheathing material;

wherein the panel does not include a separate adhesive bonding the polyurethane foam insulator to the sheathing material;

wherein the panel does not include a stud;

wherein the panel includes a corrugated, ridged, or grooved surface;

wherein the weather resistant barrier is wrapped or layered on the corrugated, ridged, or grooved surface;

wherein a gap between the weather resistant barrier and the corrugated, ridged, or grooved surface defines the drainage plane; and wherein the polyurethane foam insulator has a flame spread value between about 0 and about 25 as determined by the ASTM E84 procedure and a smoke developed value between about 0 and about 450 as determined by the ASTM E84 procedure.

2. The panel of claim 1, wherein the polyurethane foam insulator includes an R value between about R15 to about R72.

3. The panel of claim 1, wherein the polyurethane foam insulator includes an R value between about R25 to about R72.

4. The panel of claim 1, wherein the sheathing material includes at least one of a gypsum material, a magnesium oxide material, or a cementitious material.

5. The panel of claim 1, wherein the sheathing material includes gypsum, wherein the panel further includes a fluid air barrier membrane.

6. The panel of claim 1, further including a gypsum sheathing board, wherein the gypsum sheathing board further includes an ultraviolet resistant membrane.

7. The panel of claim 1, further including at least one multi-laminar edge, wherein the at least one multi-laminar edge includes a male joint and a female joint, wherein the male joint is configured to connect to a female joint of a second insulated building panel.

8. The panel of claim 1, further including a reinforcing member, wherein the reinforcing member includes a multiplicity of holes to receive the polyurethane foam insulator, wherein the reinforcing member is embedded in the polyurethane foam insulator.

9. The panel of claim 1, further including a reinforcing member, wherein the reinforcing member includes a plurality of channels, wherein the plurality of channels includes at least one of a thread rod channel, a slotted channel or a framing channel.

10. The panel of claim 1, wherein the panel is a seamless corner wall panel, wherein the corner wall panel includes a continuously insulated seamless corner and a double rail mating alignment component.

11. The panel of claim 1, wherein the sheathing material and the weather resistant barrier are a single layer, wherein the weather resistant sheathing layer includes a fiber-reinforced plastic.

12. The panel of claim 1, wherein the polyurethane foam insulator further includes a refrigerant, wherein the refrigerant includes a hydrofluoroolefin.

13. The panel of claim 1, further including cross-laminated timber, wherein the sheathing is configured to attach to the cross-laminated timber.

14. The panel of claim 1, wherein the panel includes a roof panel, a skylight panel, a bead panel, or a ridge panel.

15. The panel of claim 1, wherein the corrugated, ridged, or grooved surface is a surface of the sheathing material.

* * * * *